Patented May 12, 1931

1,804,880

UNITED STATES PATENT OFFICE

MAX ALBERT KUNZ, OF MANNHEIM, AND KARL KOEBERLE AND ERICH BERTHOLD, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

HALOGEN DERIVATIVE OF DIBENZOPYRENEQUINONES

No Drawing. Application filed July 20, 1929, Serial No. 379,868, and in Germany July 26, 1928.

The present invention relates to the production of halogen derivatives of dibenzopyrenequinones from nitro compounds of dibenzopyrenequinone.

It has been described elsewhere to produce mono- and polynitro derivatives of dibenzopyrenequinones, which term is meant to comprise 3.4.8.9-dibenzopyrene-5.10-quinone and its derivatives, the mononitro compounds being obtainable, for example, by the action of nitric acid diluted with organic solvents on dibenzopyrenequinones, the polynitro derivatives by treating dibenzopyrenequinones with nitric acid or a mixture of nitric acid and sulphuric acid.

We have now found that valuable uniform halogen derivatives of dibenzopyrenequinones, which for the most part are valuable dyestuffs and partly intermediate products for the preparation of vat dyestuffs, are obtained by directly replacing the nitro group or groups in mono- or polynitrodibenzopyrenequinones by halogen. This is effected by heating the said dibenzopyrenequinone derivatives with halogen or halogenating agents, such as for example acid halides. The replacement is preferably effected in an organic diluting medium, such as for example nitrobenzene, naphthalene, trichlorobenzene and the like. As diluting medium organic halogenating agents, for example benzoyl chloride or benzoyl bromide, may also be employed. When carrying out the treatment under strong conditions, for instance by extending the period of heating, or by working at higher temperatures, and under pressure, if desired, not only the nitro group or groups are replaced by halogen, but further halogenation occurs. The yields obtained according to our invention are about those theoretically required and, moreover, the products are obtained in a high state of purity so that they usually need no further purification which, however, may be effected by recrystallization from high boiling solvents or by precipitation from their sulphuric acid solution or by treating their aqueous paste with a solution of an oxidizing agent, such as for example a solution of a hypochlorite.

The following examples will further illustrate how the invention is carried out in practice, but the invention is not limited thereto. The parts are by weight.

Example 1

50 parts of mononitrodibenzopyrenequinone (obtainable by treating 3.4.8.9-dibenzopyrene-5.10-quinone with a mixture of nitrobenzene and strong nitric acid) are boiled, while stirring, in 500 parts of benzoyl chloride until the initial material can no longer be detected. The whole is then allowed to cool and is worked up in the usual manner. The monochlorodibenzopyrenequinone which is obtained in the form of yellow needles dissolves in concentrated sulphuric acid to give a violet coloration and dyes cotton in yellow shades from a blue red vat.

By using benzoyl bromide the monobromo derivative is obtained in an analogous manner.

Example 2

Chlorine is passed into a suspension of 42.2 parts of dinitro-3.4.8.9-dibenzopyrene-5.10-quinone (obtainable by the action of concentrated nitric acid on 3.4.8.9-dibenzopyrene-5.10-quinone) in 60 times the amount of trichlorobenzene at 175 to 180° C., while stirring, until unchanged initial material can no longer be detected and practically all is dissolved. The reaction mixture is preferably worked up by filtering the solution while still hot. When allowing the filtrate to cool, golden yellow crystals of chlorinated dibenzopyrenequinone free from nitrogen separate out. The reaction product dissolves in sulphuric acid to give a blue violet solution and furnishes from a red violet vat on cotton clear yellow shades with a reddish tinge of good fastness properties.

A dyestuff of similar properties is produced by treating mononitro-3.4.8.9-dibenzopyrene-5.10 quinone (obtainable by treating 3.4.8.9-dibenzopyrene-5.10-quinone with a mixture of nitric acid and nitrobenzene at about 180° C.) with chlorine in an organic high boiling solvent in the manner described above whereby a product is obtained containing more than 1 atom of chlorine.

What we claim is:

1. A process of producing halogen derivatives of dibenzopyrenequinones, which comprises heating a nitrodibenzopyrenequinone with a halogenating agent, at least until all nitro groups are eliminated.

2. A process of producing halogen derivatives of dibenzopyrenequinones, which comprises heating a nitrodibenzopyrenequinone in an inert aromatic diluting medium of high boiling point with a halogenating agent, at least until all nitro groups are eliminated.

In testimony whereof we have hereunto set our hands.

MAX ALBERT KUNZ.
KARL KOEBERLE.
ERICH BERTHOLD.